United States Patent
Langsenkamp et al.

(10) Patent No.: US 8,073,422 B2
(45) Date of Patent: *Dec. 6, 2011

(54) SATELLITE RADIO WARNING SYSTEM AND METHOD

(75) Inventors: Al Langsenkamp, Carmel, IN (US); Kevin McCarthy, Indianapolis, IN (US); Nathan Weinrich, Carmel, IN (US)

(73) Assignee: Cassidian Communications, Inc., Temecula, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 11/041,790

(22) Filed: Jan. 24, 2005

(65) Prior Publication Data
US 2005/0272368 A1    Dec. 8, 2005

Related U.S. Application Data

(63) Continuation-in-part of application No. 10/862,742, filed on Jun. 7, 2004.

(51) Int. Cl.
*H04M 11/04*     (2006.01)
(52) U.S. Cl. ............... 455/404.1; 455/427; 455/456.1
(58) Field of Classification Search ............... 455/412.1, 455/426.1, 410, 3.02, 427–429, 404.1, 12.1; 340/998, 539
See application file for complete search history.

(56) References Cited

U.S. PATENT DOCUMENTS

| | | | |
|---|---|---|---|
| 4,897,642 A * | 1/1990 | DiLullo et al. ............. 340/10.41 |
| 5,121,430 A | 6/1992 | Ganzer et al. | |
| 5,260,986 A | 11/1993 | Pershan | |
| 5,278,539 A | 1/1994 | Lauterbach et al. | |
| 5,432,542 A | 7/1995 | Thibadeau et al. | |
| 5,436,965 A | 7/1995 | Grossman et al. | |
| 5,448,618 A | 9/1995 | Sandlerman | |
| 5,557,658 A | 9/1996 | Gregorek et al. | |
| 5,719,918 A | 2/1998 | Serbetciouglu et al. | |
| 5,875,404 A | 2/1999 | Messiet | |
| 5,930,717 A | 7/1999 | Yost et al. | |
| 6,021,177 A | 2/2000 | Allport | |
| 6,028,537 A * | 2/2000 | Suman et al. ............. 340/988 |
| 6,038,438 A | 3/2000 | Beeson et al. | |
| 6,084,510 A | 7/2000 | Lemelson et al. | |
| 6,097,938 A * | 8/2000 | Paxson ..................... 455/410 |
| 6,104,931 A | 8/2000 | Havinis et al. | |
| 6,112,075 A | 8/2000 | Weiser | |
| 6,122,520 A | 9/2000 | Want et al. | |
| 6,167,266 A | 12/2000 | Havinis et al. | |

(Continued)

OTHER PUBLICATIONS

"How Satellite Radio Works" Web Article from www.howstuffworks.com; http://electronics.howstuffworks.com/satellite-radio.htm; last visited Nov. 12, 2004; publication date unknown.

*Primary Examiner* — Charles Shedrick
(74) *Attorney, Agent, or Firm* — Knobbe Martens Olson & Bear LLP

(57) ABSTRACT

A system and method for distributing messages to a plurality of satellite receivers comprising sending a message with geographic target area coding or information via satellite or a ground repeater to at least one satellite receiving device equipped with geographic-aware information. The satellite receiving device thereafter utilizes its geographic aware information to compare with the geographic target area coding in the transmitted message to determine whether the satellite receiving device should present the message to the user of the satellite receiving device.

15 Claims, 5 Drawing Sheets

Mobile Notification System

U.S. PATENT DOCUMENTS

| | | | |
|---|---|---|---|
| 6,208,975 B1 | 3/2001 | Bull et al. | |
| 6,236,365 B1 | 5/2001 | LeBlanc et al. | |
| 6,259,405 B1 | 7/2001 | Stewart et al. | |
| 6,266,612 B1 | 7/2001 | Dussell et al. | |
| 6,266,615 B1 | 7/2001 | Jim | |
| 6,295,449 B1 | 9/2001 | Westerlage et al. | |
| 6,308,132 B1 | 10/2001 | Wilson et al. | |
| 6,317,718 B1 | 11/2001 | Fano | |
| 6,327,471 B1 * | 12/2001 | Song | 455/440 |
| 6,347,216 B1 | 2/2002 | Marko et al. | |
| 6,349,257 B1 | 2/2002 | Liu et al. | |
| 6,356,761 B1 | 3/2002 | Huttunen et al. | |
| 6,381,463 B1 * | 4/2002 | Tu et al. | 455/456.5 |
| 6,397,054 B1 | 5/2002 | Hoirup et al. | |
| 6,397,076 B1 * | 5/2002 | Brown et al. | 455/521 |
| 6,463,273 B1 | 10/2002 | Day | |
| 6,509,833 B2 | 1/2003 | Tate | |
| 6,516,191 B1 | 2/2003 | Greenspan et al. | |
| 6,522,875 B1 | 2/2003 | Dowling et al. | |
| 6,556,664 B1 | 4/2003 | Langsenkamp | |
| 6,567,504 B1 | 5/2003 | Kercheval et al. | |
| 6,590,507 B2 * | 7/2003 | Burns | 340/995.13 |
| 6,621,900 B1 | 9/2003 | Rice | |
| 6,710,711 B2 | 3/2004 | Berry | |
| 6,724,861 B2 | 4/2004 | Newland et al. | |
| 6,731,940 B1 | 5/2004 | Nagendran | |
| 6,735,431 B1 | 5/2004 | Tsunami et al. | |
| 6,745,021 B1 | 6/2004 | Stevens | |
| 6,792,081 B1 | 9/2004 | Contractor | |
| 6,813,502 B2 | 11/2004 | Son et al. | |
| 6,816,878 B1 | 11/2004 | Zimmers et al. | |
| 6,819,919 B1 | 11/2004 | Tanaka | |
| 6,836,667 B1 | 12/2004 | Smith, Jr. | |
| 6,842,774 B1 | 1/2005 | Piccioni | |
| 6,882,708 B1 | 4/2005 | Bedingfield et al. | |
| 6,912,270 B1 | 6/2005 | Drury et al. | |
| 6,912,271 B1 | 6/2005 | Tuttle | |
| 6,947,754 B2 | 9/2005 | Ogasawara | |
| 7,139,551 B2 * | 11/2006 | Jamadagni | 455/412.1 |
| 7,233,781 B2 | 6/2007 | Hunter et al. | |
| 2002/0054670 A1 | 5/2002 | Shtivelman | |
| 2002/0067806 A1 | 6/2002 | Rodriguez et al. | |
| 2002/0136381 A1 | 9/2002 | Shaffer et al. | |
| 2002/0156578 A1 * | 10/2002 | Kondou et al. | 701/213 |
| 2002/0178454 A1 * | 11/2002 | Antoine et al. | 725/106 |
| 2003/0100326 A1 | 5/2003 | Grube et al. | |
| 2004/0132467 A1 | 7/2004 | Hull et al. | |
| 2004/0192189 A1 * | 9/2004 | Yuhara et al. | 455/3.02 |
| 2004/0198389 A1 | 10/2004 | Alcock et al. | |
| 2004/0266398 A1 * | 12/2004 | Adamczyk et al. | 455/412.1 |
| 2005/0003797 A1 | 1/2005 | Baldwin | |
| 2005/0070247 A1 | 3/2005 | Larson et al. | |

\* cited by examiner

Cell Tower Area

Mobile Notification System

SATELLITE RADIO WARNING SYSTEM AND METHOD

This invention relates to a system and method of identifying and communicating to mobile devices within a designated geographical area. Further, this invention is a Continuation-In-Part of and claims priority to U.S. patent application Ser. No. 10/862,742, filed Jun. 7, 2004, and titled Automated Mobile Notification System.

BACKGROUND

I. Introduction

Automated telephone calling systems have been implemented by governmental authorities and agencies across the country primarily for the purpose of contacting residents in case of an emergency. In practice, these automated systems have typically been implemented to identify and contact residents within a defined geographic area which is considered a potential emergency area. For example, an automated telephone calling system may be utilized to contact all residents within the projected path of a tornado, flood zone, or the hazardous area surrounding a chemical spill. Once a resident within the emergency area is contacted, a pre-recorded, situation specific message is played, encouraging the residents to take cover, evacuate, or take other appropriate measures.

Until recently, the use of automated telephone calling systems has been limited to land line applications. With the advent of wireless communications and an increasingly mobile society, there is a desire to reach the mobile populous in the case of an emergency to the same extent as residents near a landline. Additionally, an automated telephone system capable of alerting mobile device users is applicable to a broader range of situations than those addressed by the land line systems. For example, mobile users could be quickly informed of reported road hazards, construction areas, traffic delays and alternate routes upon traveling into an area near those situations, as well as being informed of the emergencies reported under the current land line systems. Therefore, there is a strong need for an automated telephone calling system for mobile devices. The terms "mobile devices" or "cellular devices" as used herein is intended to encompass all mobile communication devices, including mobile telephones, PDA's, pagers, PCS phones, mobile text messaging devices, and all reasonably similar devices utilizing similar technology for mobile communications.

II. Automated Telephone Systems Generally

Automated telephone calling systems have been implemented by many government authorities to automatically contact their citizens in the event of an emergency. Sigma Communications, Inc. ("Sigma") markets an automated telephone calling system under the registered trademark REVERSE 911®. These automated telephone calling systems are used to quickly contact individuals residing in an emergency area and transmit an emergency message (e.g., evacuation, take cover, etc.) to residents of those areas (see U.S. Pat. No. 6,567,504, particularly background, detailed description). For example, automated telephone calling systems are often used by government authorities to contact individuals about the existence of a sited tornado in their area. Automated telephone calling systems typically include mapping software that allows the emergency area to be easily defined. Unfortunately, the automated telephone calls made by these prior art automated telephone calling systems have been limited to land lines, such as those land lines associated with businesses and residences in the emergency area. Individuals who are in the emergency area but do not have access to land lines (e.g., those individuals in automobiles) do not receive the emergency message. Accordingly, it would be desirable to provide an automated phone calling system capable of providing emergency messages to land lines as well as mobile devices.

III. Current Mobile Communication Systems

Modern mobile devices use a cellular network to communicate. This network uses multiple base stations to transmit and relay incoming and outgoing cellular messages which may take the form of voice messages, digital data, pictures, short message service (discussed below), and various other forms of message transmission. Each base station is typically comprised of three antennas, and each antenna services one of three sectors surrounding the base station, as shown in FIG. 1. These three sectors comprise the area in which the base station is capable of transmitting messages to mobile devices.

A. Typical Operation of a Cellular System

A typical mobile communications system (e.g., a cellular system) comprises several base stations transmitting data to and receiving data from cellular devices within its transmission area (a "cell"). The typical mobile communications system further comprises at least one switching office with each switching office associated with a plurality of the base stations. Such systems further comprise a database to identify the mobile devices operating within the system, and mobile devices for communicating to and from the base stations.

Discussing each portion of a system in turn, the base stations of a cellular system are transmitting and receiving towers. Each base station uses three low-power transmitters to transmit signals to and receive signals from mobile devices within its transmission range. Each transmitter is also equipped with an antenna for receiving signals from a mobile device within its range. The effective range of a base station is referred to as a "cell." Each cell can be divided into three sectors ("sectors" or "cellular sectors"), corresponding to the three transmitters, as depicted in FIG. 1, and each sector is defined by sector boundaries 10 as depicted by in FIG. 1. While the boundaries as depicted indicate that a sector consists of a wedge shape comprising one third of a circular transmission area, these boundaries are merely an exemplary model of a cellular transmission perimeter and the corresponding transmitting areas of each of the three transmitters. Another common model of cell sectors is that where transmission boundaries for each base station form a hexagon with a base station at the center of the hexagon, and each sector forms a quadrilateral shaped region such that all cells of the network fit nicely together along the cell boundaries. However, the actual sector shape and transmission boundaries defining any cell take other geometrical shapes or proportions with typically overlapping sectors. The base stations are low-power transmitters, encompassing a relatively small geographic area for each cell. Therefore, a cellular system requires several base stations to ensure that a large geographic area can be covered by a cellular service provider.

A mobile device switches the base station with which it is primarily transmitting as the device moves from one cell to another, requiring a separate device or system to orchestrate the interaction between the mobile device and the several base stations within a particular area. The device responsible for this management is referred to as a "base controller," which is primarily responsible for determining which base station should transmit to the cellular device at any given time, and managing the sequence of switching the base station responsible for the cellular device in operation (sometimes referred to as managing the "hand off" between base stations). In turn, a centralized switching office controls all interaction between the entire system of the service area and other systems operated by other service providers.

When a mobile device is first activated (or powered up), the device monitors a control channel which every base station emits to determine the System Identification Code (SID) emitted by the base station. The SID indicates to the mobile device whether the mobile device is operating on a system controlled by its home service provider or another carrier. If the SID indicates that the system is that of another carrier, the mobile device transmits its authentication information, which includes the identity of its home service provider. This information is transmitted to the local switching office, which adds the device to its database of devices which are operating within its system, but which do not use its system as a home service provider. This information is maintained in a database known as a Visitor Location Registry ("VLR"). The switching office then verifies the authenticity of the information transmitted from the mobile device by contacting the switching office of the mobile device's home service provider. There, the information is compared to a database of mobile devices that use the system as a home service provider—a Home Location Registry ("HLR"). If the information is verified, the HLR is updated to indicate the current location of the mobile device so that any incoming messages to the mobile device may be routed to the base station nearest the mobile device, and thereby transmitted to the mobile device. Similarly, the VLR is updated to indicate that the mobile device is authorized to use the system in which it is operating, allowing the mobile device to send outgoing messages. These databases are constantly updated, tracking the sector where the mobile device is located as long as the device remains powered up, by monitoring the strength of reception of specific antennas of the base station(s) that is/are being used to communicate with the device. Therefore, the specific sector of the cell where the mobile device is currently located can be identified by the registers.

B. Various Devices and Methods for Receiving Mobile Messages

As briefly discussed above, messages can be transmitted in various forms via mobile devices. Verbal or other audible messages may be transmitted through cellular or digital phones or other suitable devices such as advanced PDA's or wireless equipped laptop computers. Additionally, text messages may be sent via a method known as Short Message Service ("SMS"), on devices capable of receiving this type of transmission. SMS allows for short text messages to be sent to and from a mobile device (e.g., a mobile phone, PDA, etc.), and operates in much the same fashion as cellular telephony. However, an SMS system further comprises a Short Message Service Center ("SMSC") which is a combination of hardware and software responsible for the relaying, storing, and forwarding of a short message between SMS devices through the cellular system. Therefore, SMS capable devices operate by utilizing an existing cellular network as described above, but further require the use of an SMSC to facilitate the transfer of SMS messages to and from mobile SMS devices.

Moreover, and in addition to voice and text, another form of communication that can be transmitted to and from mobile devices includes the data packet. Data packets may include, but are not limited to, relevant information such as:

1. Warning area description;
2. Description of warning;
3. Recommended actions;
4. Warning level;
5. Road conditions;
6. Weather conditions; and
7. Traffic information.

As discussed more fully in the summary and description sections herein, data packets are particularly useful in embodiments of the invention where the mobile devices are intelligent, i.e., embedded software in the mobile device allows it to analyze data packet information and through trending of GPS or other equivalent data, determine the appropriate action in response to the information received in the data packet. Data packets can be transmitted via multiple types of transmission mechanisms including but not limited to SMS, TCP/IP, IBM-MQ, HTTP, SOAP, JMS or other equivalent protocols.

Indeed, many people have access to mobile devices with SMS service, and a large portion of the population now owns a cellular phone of some description. If a message could be sent to these persons in an emergency situation, those individuals could take the proper precautions, and more lives could be saved. Accordingly, there is a need for a method of identifying and contacting mobile devices in an emergency area when an emergency message is distributed to that area. The present invention contemplates integration of automated telephone calling systems with the far reaching abilities and two-way transmission capabilities of SMS and other means of wireless communication, such as wireless communication via transmission mechanisms such as TCP/IP, IBM MQ, HTTP, SOAP, JMS and other equivalents.

C. Satellite Communications Systems

1. Generally

The advent of satellite communication technology allows digital signals to be transmitted from a single location to cover a large geographic area. In operation, a transmitter station transmits a signal to one or more satellites orbiting the Earth, where the signal(s) is(are) then re-broadcast (or "bounced") to receivers on the ground. The ground receivers can take the form of stationary satellite receivers, such as satellite dishes used by many households to receive satellite television, radio, and Internet broadcasts. Additionally, the ground receiver can take the form of portable and handheld receivers such as those manufactured for XM Satellite Radio, Inc. of Washington, D.C.; Sirius Satellite Radio, Inc. of New York, N.Y.; and WorldSpace Corporation of Washington, D.C. to receive satellite radio transmissions primarily in portable or automotive applications. Once the signal is received by the ground receiver, the signal is decoded by a processing chip to convert the digital transmission into a usable form by the recipient, usually in the form of audio broadcasts, video broadcasts, or Internet broadcasting. Additionally, satellite transmissions are often difficult to receive in cities where buildings may block the satellite signal, so the use of repeating towers ("ground repeaters") to receive the signal and retransmit the signal for better receipt by the recipient is typically used in major metropolitan areas.

2. Mobile Satellite Receivers

Currently, mobile satellite receivers are typically utilized to receive radio broadcasts. In 1997, the FCC granted satellite digital audio radio service licenses to Sirius Satellite Radio and XM Satellite Radio to offer nationwide radio broadcasts throughout the United States by utilizing a portion of the S band of satellite communications. Currently, both of these companies are utilizing proprietary receivers comprising an antenna and a proprietary chip set to allow subscribing individuals to receive satellite radio programming in their automobiles or other portable radio devices. Currently, use of a content provider's proprietary receiver is required to receive programming from the content provider.

Each content provider utilizes geosynchronous or elliptically orbiting satellites to rebroadcast its signals across the United States and elsewhere, allowing mobile receivers and ground repeaters to pick up signals that can be broadcast from a single location. Ground repeaters are typically used in urban areas to receive and rebroadcast the signal in urban areas where the signal from the satellites can be obscured or interrupted by tall structures and electromagnetic noise. The general operation of these ground repeaters is described in U.S. Pat. No. 6,347,216 (the "'216 patent"), incorporated herein by reference. However, the ability to transmit a signal nationwide from a single location does have its drawbacks. As noted in the '216 patent, satellite broadcasts are inherently geographically generic, with each recipient receiving the same information, regardless of their geographic location.

The '216 patent proposes one method for addressing the lack of geographic specificity in satellite broadcasting. In particular, the '216 patent describes a method of allowing a mobile receiver to identify its approximate geographical location by reading header information in a transmission that is created by each ground repeater to identify which ground repeater is transmitting the signal being received by the receiver. The receiver is capable of utilizing the ground repeater's identification code to determine that the receiver must be within the transmitting radius of that ground transmitter, and thereby selects geographically appropriate transmissions to present to the individual by filtering header information from packets or frames of the data channels being transmitted in the composite transmission signal.

While the '216 patent does allow for ground transmitted digital radio signals to contain geographic differentiation, it would be beneficial to provide a method and/or system that is capable of being more geographically specific. Further, it would be advantageous to provide a method and/or system for allowing geographically specific broadcasts without relying upon ground transmitters to provide the geographic location of a receiver because ground transmitters do not exist in many locations.

3. Stationary Satellite Receivers

Stationary satellite receivers are utilized by many consumers to receive television broadcasts, digital music transmissions, and broadband cable in homes or businesses through direct broadcast satellite providers. Multiple content providers exist, such as DirecTV and Dish Network, providing subscriptions to television and movie channels. These content providers generate income by charging subscribers for channel packages and other services such as on demand movies and pay per view service. In order to ensure that subscribers receive only the channels and services for which they have subscribed, content providers typically encrypt their broadcast transmission. The encrypted signal is then descrambled by a decoder chip within a recipient's receiver. The decoder chip descrambles only those signals related to channels that have been purchased by the recipient, but the chip can be reprogrammed to receive other channels by software sent in the transmission signal, a telephone connection, or by placing a new chip in the receiver.

However, the current decryption system is capable of being exploited through the use of decryption cards or chips that can be used by individuals with a receiver to descramble transmissions for which they have not paid. Enforcement of satellite television piracy is costly to service providers, and is often difficult to prove. Therefore, a device and method for preventing the piracy of satellite transmissions would be greatly appreciated.

IV. Current Mobile Warning Systems

Previously proposed technology for mobile warning systems only provides for transmitting a signal to all devices within range of a cellular station which coincides with an identified emergency area. Further, these previously proposed systems suggest that base stations within an emergency area should be used to transmit a predetermined signal to activate distributed warning devices within the transmission area, producing a generalized warning from the activated device which is specially adapted to receive the signal and activate a warning. In particular, the warnings contemplated by the previously proposed systems consist of a predetermined audible alarm similar to a smoke detector alarm, or the activation of a radio receiver to tune into a pre-selected emergency station. Therefore, the warning generated to the general public, at best, simply alerts the recipients of a threat somewhere within the transmission area of the base station activated, with the possibility that the recipients might be further apprised through a radio network. This technology bears a striking resemblance to the traditional emergency siren used in many communities to indicate the presence of a tornado or similar emergency, and falls prey to many of the same shortcomings, including the lack of specific information regarding the threat involved, the requirement of distributing new warning devices to all those who need to be contacted, and the potential for contacting individuals not located within an identified emergency area.

Rather than simply emitting a generalized warning, it would be preferable for an emergency system to tailor the message relayed to mobile devices within an identified emergency area so that detailed instructions for a particular situation could be generated. By having the capability of creating a new message for each identified emergency (a "situation specific" message), the individuals reached by the emergency transmission could be directly informed of the nature of the emergency, the severity of the emergency, and the current geographic boundaries of the emergency area. Therefore, those individuals informed by a situation specific message would be more fully informed of the situation, and more likely able to make an informed decision regarding how to further proceed to best insure their safety. Additionally, those individuals not within the emergency area could be given sufficient notice and information regarding the emergency area so that they could (1) take steps to avoid the emergency area, (2) realize that the warning does not pertain to them, or (3) take another appropriate response. Therefore, the ability to generate situation specific messages to individuals within an identified area is preferable.

In addition, the previously proposed technology requires the distribution of warning devices which are specifically programmed to respond to the transmission of a specific signal. By requiring the general public to obtain a device not already in their possession, either the projected number of individuals who might be reached by the transmission of an emergency signal is reduced, or the cost for implementing such a system is dramatically increased. By contrast, it would be preferable to utilize a device, class of devices, or a number of different types of devices which are already in use by the consuming public as the warning device so that a greater number of potential individuals might be notified in the case of an emergency (or other situation) and the system can be implemented with a lower cost.

Finally, current warning systems transmit a warning signal to the full extent of the transmission area of any base station identified to be within the emergency area. Because the transmission area of the transmitting base stations is likely to substantially exceed the boundaries of the emergency area, it is likely that a substantial number of individuals carrying a warning device would receive a general warning signal even though they were neither within nor traveling toward an emergency area. Therefore, it is advantageous to have a means of more accurately defining an area of transmission so that the number of individuals unnecessarily contacted by an emergency warning is reduced.

Therefore, it is advantageous to provide a system that addresses the shortcomings inherent in the previously proposed systems. In particular, the identification of mobile devices within a designated area, and a means for an administrator to send a message tailored for each instance requiring notification (a "situation-specific message") to each mobile device identified within that area would be beneficial. Additionally, allowing for increased specificity of the geographic identification, and the ability to tailor messages sent to the mobile devices within that location would cause urgent communications to be more clear, complete, and reliable. The ability to constantly tailor the system further increases the applicability of a mobile notification system to other uses that are not currently available. For example, the ability to generate messages to mobile devices within a geographic area could have a wide range of applicability, from informing travelers of alternate routes in the event of vehicle crashes, a chemical spill, or road construction delays within a particular area, to being used in connection with a subscriber database to send messages regarding current local cultural or retail activities or points of interest when a subscribing mobile device enters into the boundaries of a city. Therefore, improvements over the current technology would not only improve upon current emergency notification systems, but would also present useful embodiments to other notification applications.

SUMMARY

One method of distributing messages to mobile devices (cellular phones, PDA's, pagers, etc.) which are part of an existing cellular network comprises four steps. First, a desired message distribution area is defined. Then, a larger distribution area (an "expanded message distribution area") is identified as the area defined by the boundaries of all base station sectors which contain a portion of the defined message distribution area. Next, all active mobile devices within that expanded message distribution area are identified, and a message is transmitted to those identified mobile devices. "Active" mobile devices are those mobile devices that are turned on an in communication with the base station. Additionally, identification of the devices within the expanded distribution area may be accomplished by utilizing a software program. Finally, the software may be in communication with a switching office which controls the system operating any base tower which contains a sector encompassing a portion of the message distribution area.

Another method of distributing messages to a plurality of mobile devices which are part of an existing cellular network comprises at least three steps. First, a desired distribution area is defined. Second, the transmission area perimeter of all base stations encompassing at least a portion of the message distribution area is identified, and situation-specific messages are transmitted to the mobile devices within the perimeter of those identified base stations. Third, the base station sectors encompassing a portion of the distribution area can be identified, and messages may be transmitted only to mobile devices within the identified sectors. In an alternative embodiment, before situation specific messages are transmitted to the mobile devices, a communication is delivered to each device asking whether the mobile device is indeed within the desired distribution area. Each mobile device equipped with a global positioning system or equivalent may then confirm its presence within the desired distribution area back to the base station. Once confirmation is received, the situation specific message is delivered to the mobile device. In yet another alternative embodiment, mobile devices could be programmed to periodically report their positions to respective base stations. These reported positions may then be used to identify which of those mobile devices within the expanded distribution area actually fall within the desired distribution area. Once the global positioning system is used to identify which mobile devices are actually within the desired distribution area, a message is transmitted to those identified mobile devices actually within the desired distribution area.

The system of distributing messages to mobile devices comprises an automated calling system which is used to define an area in which persons should be notified, and to further contact mobile devices identified within the defined area. If the invention is used to distribute emergency warnings, for example, the mapping device of the automated calling system or equivalent would circumscribe the area affected by the emergency and identify the corresponding sectors of the base stations serving the circumscribed area. Additionally, the system should include at least one identifying device operable to acquire identification data of mobile devices within the defined area. The identifying device serves to determine what mobile devices are within the circumscribed area, and may take the form of a remote agent which is a software program operable to query a switching center to determine what mobile devices are active within the identified sectors of stations serving the defined area. In an alternative embodiment, the mobile devices themselves could determine if they are in the defined area. For example, mobile devices outfitted with GPS receivers could receive emergency warnings for an emergency area, the mobile devices could then determine if the emergency warning is relevant based upon the location of the warning device, and then notify the user of the mobile device if the emergency warning is relevant.

Furthermore, the method of distributing messages to a number (plurality) of mobile devices in an existing cellular network is carried out first by defining a desired message distribution area. Typically, determining the distribution area will be influenced by the geographic proximity to an event, situation, or location believed to be important to potential recipients within an area. Next, an expanded message distribution area is defined based on the ability of the system to precisely identify the location of mobile devices within the desired message distribution area. That may be accomplished through the ability of the base station and switching office to identify mobile devices within each sector of a base station, or it may be accomplished through the use of other positioning methods or devices.

Yet another embodiment of the current invention comprises a system of distributing messages to a number of mobile devices comprising an automated calling system which is used to define a message distribution area. Additionally, a short message service center operable to send short message service messages to applicable mobile devices is utilized to receive and send short message service messages to the devices. A remote agent, which may take the form of a software program in contact with the automated calling system and the short message service center, acts to identify mobile devices within the message distribution area. Additionally, the system may be operable to send short message service communications to the identified mobile devices. Furthermore, the system may query individual mobile devices utilizing a global positioning system to determine if the mobile devices are actually within the message distribution area. A message is then transmitted to those mobile devices that confirm their presence within the message distribution area.

Another embodiment of the current invention comprises a method for distributing messages to satellite receiving devices, comprising the steps of generating at least one message having at least a substantive message and a geographic target area coding, transmitting the at least one message from at least one satellite, receiving the at least one message with a satellite receiver, and communicating the substantive message to a recipient if the geographic location of the satellite receiver falls within the message distribution area coding. Further, the geographic location of the satellite receiver may be determined by a global positioning system. Additionally, software that tracks the past locations of the satellite message device and develops trends in the movement of the device to predict the future movement of the satellite message device may be used. This software also causes the substantive message to be communicated to the recipient if the satellite message device is within a preset distance from a message distribution area and moving toward the message distribution area. Alternatively, rather than using a geographic positioning device, the geographic location information associated with the satellite receiver may be determined by inputting the geographic location into at least one processor that is used in the system. According to one method, that geographic location information inputted may take the form of such location specific identifiers as a Zip Code, Zip+4, telephone area code, census tract, coordinate, or street address to allow a user to conveniently identify the geographic location of the receiver.

Thus, in one embodiment of the method of the present invention, the locations of past locations of the satellite message device is tracked and analyzed for trends in movement of the device to predict future movement of the device.

Yet another embodiment of the present invention relates to a system for distributing messages, comprising a transmitter, at least one satellite, at least one receiver, and at least one processor in communication with the satellite receiver's geographic location information. Further, the system may include a global positioning system, and the global positioning system may additionally determine the receiver's geographic location information. Alternately, the system may not include a global positioning system, but the geographic location of the satellite receiver may be determined by manually inputting the geographic coordinates of the satellite receiver. Additionally, a mobile satellite transmitter may be included in the system.

According to another embodiment of the present invention, a device for receiving satellite messages comprises a satellite receiver, a global positioning system, and at least one processing chip in communication with the global positioning system. Further, the at least one processing chip may be operable to compare geographic identifying data transmitted with current coordinates produced by the global positioning system. Additionally, the device for receiving satellite messages may further comprise software for recording and trending the device's location.

Yet another embodiment of the present invention is a device for receiving satellite messages, comprising a satellite receiver operable to receive transmissions from at least one satellite, a global positioning system operable to identify the geographic location of the device, and at least one processing chip in communication with the ground receiver and global positioning system operable to compare the message distribution area code transmitted in a satellite transmission to the current geographic location of the device. Further, the device for receiving satellite messages may further comprise a display or audible transmitter for communicating a message to a recipient. Additionally, the satellite receiver may be operable to receive transmissions from at least one ground repeater.

According to still another embodiment of the present invention, a device for preventing piracy of satellite transmissions comprises a database of a geographic location of each satellite service subscriber, a global positioning system, and a satellite receiver having at least one processing chip, the receiver operable to compare current global positioning system coordinates with the geographic location of subscribers. Additionally, the device may comprise a decoder operable to descramble a satellite signal if the global positioning system coordinates fall within at least one geographic location of satellite service subscribers. Further, the device may comprise a telephone connection operable to contact a satellite service provider if the global positioning system coordinates do not fall within at least one geographic location of satellite service subscribers.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
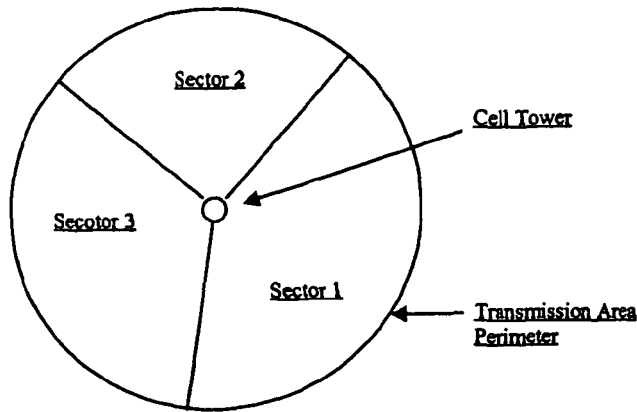
FIG. 1 shows a diagram depicting the effective range of a cellular base station, further depicting the three transmission sectors of each base station.

With reference to FIG. 1, a base station's effective transmission area (defined by the transmission area perimeter 12) is divided into three sectors, corresponding with three transmission antennas located on each base station (or cell tower 14). The combined transmission areas of the transmission antennas comprise the overall transmission area of the base station (a "cell"), but each mobile device operating within the transmission area of the base station is identified as operating primarily within one of the sectors. Each sector is defined by a boundary 10 and a transmission area perimeter 12, creating a sector represented in the shape of a wedge for purposes of this example. However, the actual geometry of a sector and the true location of each boundary may take different forms in reality. Therefore, the location of each mobile device can be pinpointed to the sector of the base station within which it resides if the mobile device is powered up.

Figure 2:
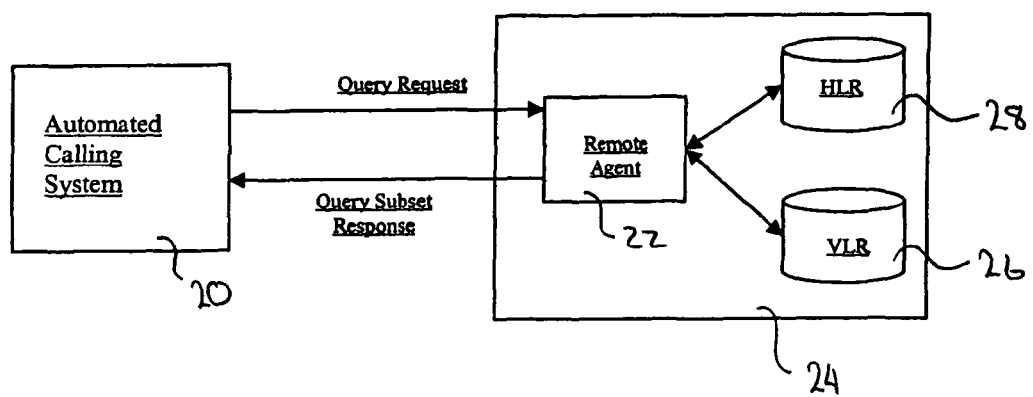
FIG. 2 shows a diagram depicting the interface between an automated telephone calling system and a remote agent, in this instance the remote agent being a Short Message Service Center.
Figure 4:
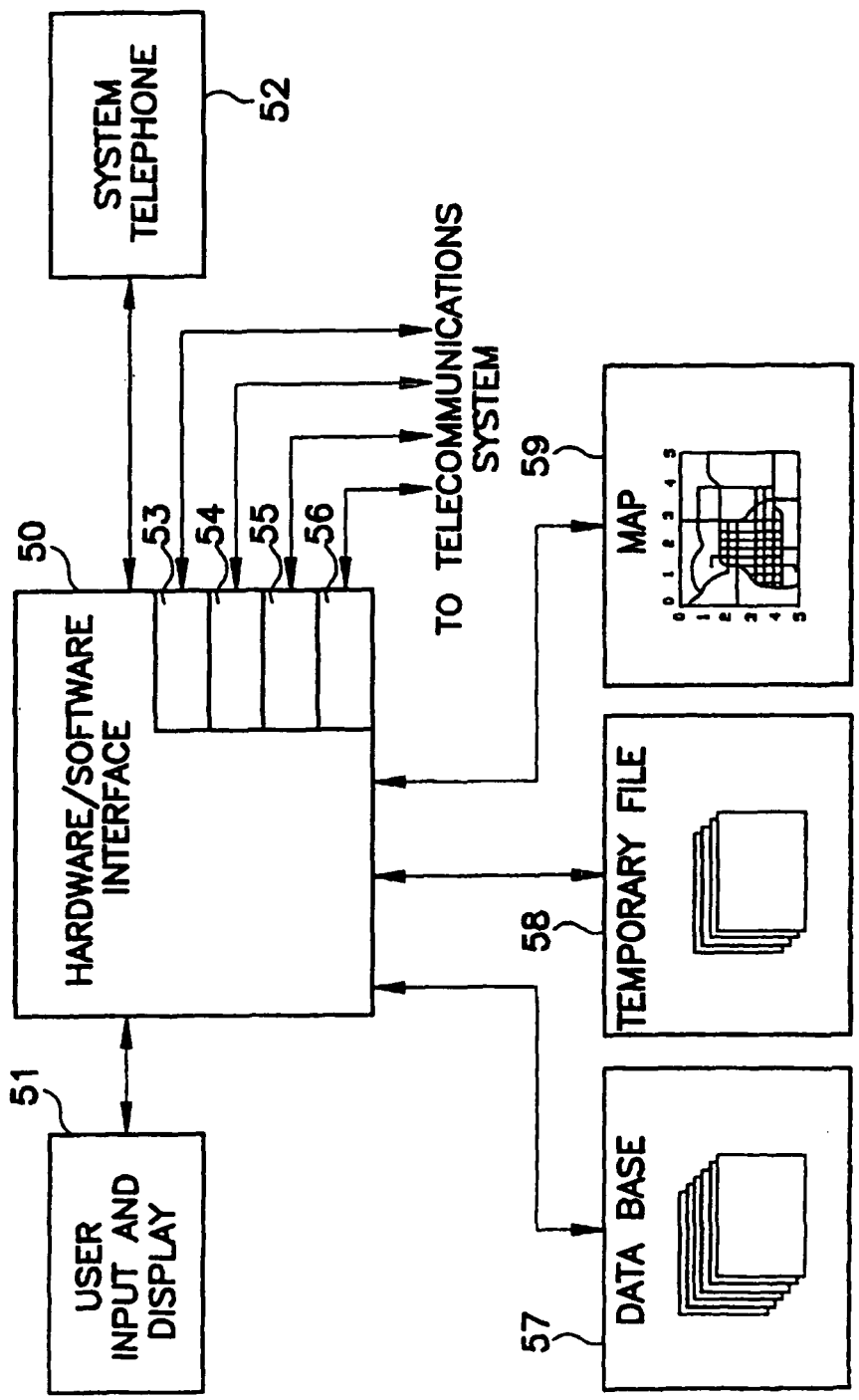
FIG. 4 shows a diagram depicting elements comprising an automated calling system.

With reference to FIG. 2, an exemplary embodiment of an automated notification system includes an automated telephone calling system 20, and a remote agent 22 located in communication with switching office 24. A representative automated calling system is described in U.S. Pat. No. 6,567, 504, which is incorporated herein by reference. However, it can be generally stated that an automated calling system generally comprises a hardware/software interface 50, a user input and display 51, a system or telecommunications interface 53-56, a database 57, a temporary file 58, and a software driven mapping device 59 as indicated by FIG. 4. In function, the automated calling system is operable to define a geographic locality or area for message distribution using the mapping device and automatically distribute messages to those devices identified as existing within the defined area by the remote agent 22.

The automated calling system 20 communicates with the remote agent 22 by sending parameters defining a geographic distribution area to the remote agent, typically through a network connection (e.g., the Internet) or a dedicated line (e.g., a phone line). The desired message distribution area is a geographic area with parameters defined by the automated calling system or any equivalent system with mapping capabilities, including mapping systems that may include, for example, the ESRI mapping system or the MAP INFO mapping system. For example, the desired distribution area may be defined by a zip code area, a quadrilateral defined by four longitude/latitude positions, an area bounded by a number of city streets, all geographic locations within a given distance of a particular point, or any other number of methods for defining a desired message distribution area. Such methods are well-known in the art through the use of software-driven mapping devices.

The remote agent 22 is a software program capable of acquiring a list of mobile devices located in the distribution area defined by the automated calling system 20. In one embodiment of the present invention, the remote agent can accomplish this task by identifying the base station sectors which contain any portion of the distribution area (the "expanded distribution area"). Thus, the expanded distribution area is defined by the boundaries of one or more adjacent base station sectors which encompass at least a portion of the defined distribution area. Adjacent base station sectors are those which touch, overlap, or are generally not separated by another base station sector. Once the extended distribution area is defined, the remote agent identifies the mobile devices active within that area. To this end, the remote agent 22 queries the VLR 26 and HLR 28 (to which the remote agent is typically connected via a network connection or telephone line) within the switching office responsible for the area encompassed within the expanded distribution area. The VLR 26 and the HLR 28 then return a list of all active mobile devices along with data regarding those devices within the defined area to the remote agent 22. The remote agent 22 compiles a list of all mobile devices, including device IDs (e.g., telephone numbers) within the expanded distribution area. This device identification data (including telephone numbers) is then sent back to the automated calling system 20. From this returned list, the automated calling system 20 then distributes messages to the mobile devices in the distribution area. In particular, the automated calling system uses the mobile device identification data received from the remote agent 22 to place a call or send another form of message to each mobile device in the expanded distribution area.

As an example of the above, consider an automated calling system having a telecommunications interface that is connected to a telecommunications system and thereby connected to a cellular network. As discussed above, the automated calling system is operable to identify the distribution area 30 shown in FIG. 3 to receive an emergency message. This distribution area (the emergency area) is passed on to the remote agent 22. After receiving the defined distribution area, the remote agent 22 determines that the defined distribution area 30 falls within the range of base stations 32 and 33. In particular, the remote agent determines that distribution area 30 falls within sectors 32(*b*) and 32(*c*) of base station 32 and sector 33(*a*) of base station 33. The remote agent then queries the HLR 28 and VLR 26 to retrieve a list of active mobile devices in these sectors 32(*b*), 32(*c*) and 33(*a*), (the "expanded distribution area" as shown by the cross-hatching in FIG. 3). Upon response from the HLR 28 and VLR 26, the ID's for these mobile devices are listed by the remote agent and returned to the automated calling system. At some point, the user of the automated calling system uses the user input and display to enter the emergency message into the memory of the system. The automated calling system 20 then sends a message to each of the mobile devices in the expanded distribution area by communicating the IDs of the mobile devices returned from the agent.

From the above example, it is apparent that contacting all mobile devices within the expanded distribution area will result in mobile devices being contacted that are not actually within the distribution area. This slight overstating of the distribution area is an acceptable margin for error to insure that all mobile devices within the distribution area actually receive the message. Furthermore, the expanded distribution area can serve as a safeguard if the automated notification system is used as an emergency notification system, as the slight overstatement merely notifies mobile devices that might soon be traveling into the emergency area.

Figure 3:
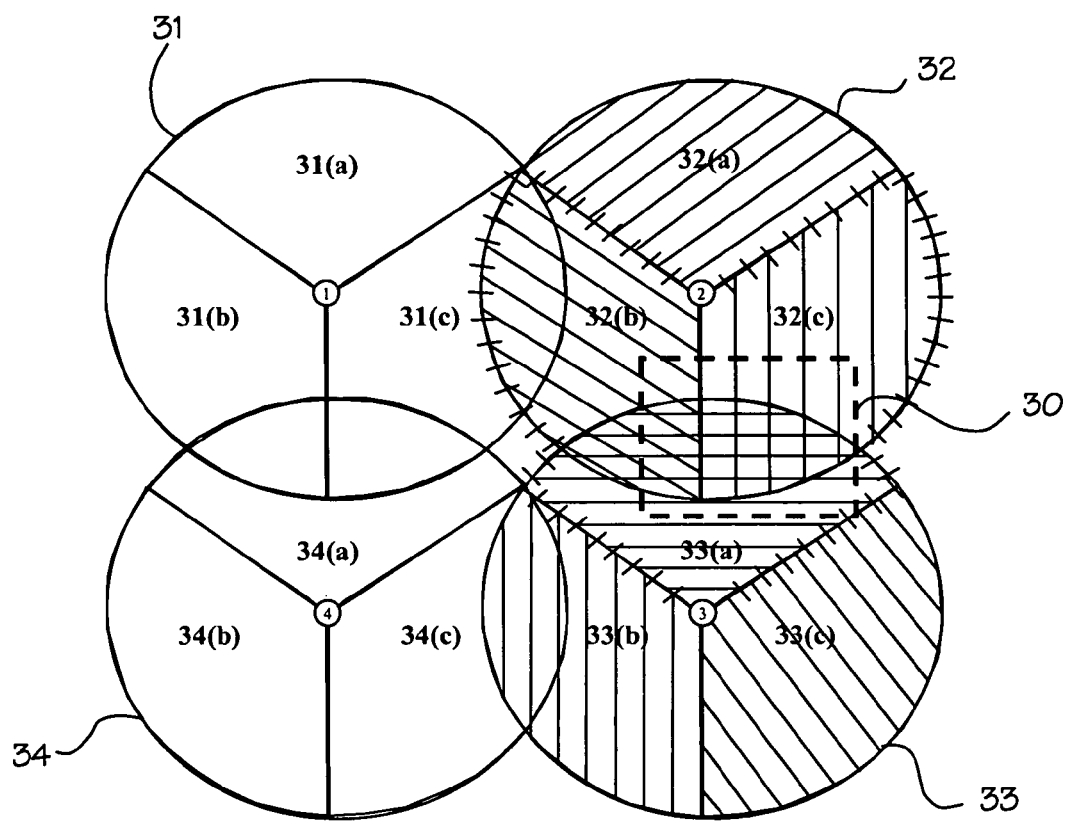
FIG. 3 shows a diagram depicting the effective range of four separate cellular base stations, the individual sectors of each base station.

Yet another embodiment of the present invention involves the use of an automated calling system which identifies the distribution area 30 shown in FIG. 3. This distribution area is passed on to the remote agent 22. After receiving the defined distribution area, the remote agent 22 determines that the defined distribution area 30 falls within the range of base stations 32 and 33. In particular, the remote agent determines that distribution area 30 falls within sectors 32(*b*) and 32(*c*) of base station 32 and sector 33(*a*) of base station 33. The remote agent then queries the HLR 28 and VLR 26 to retrieve a list of active mobile devices in these sectors 32(*b*), 32(*c*) and 33(*a*), (the "expanded distribution area" as shown by the cross-hatching in FIG. 3). Upon response from the HLR 28 and VLR 26, the ID's for these mobile devices are listed by the remote agent and returned to the automated calling system. The automated calling system 20 then sends an SMS message to each of the mobile SMS devices in the expanded distribution area by generating a text message, data packet or other equivalent and sending it to the SMSC to forward to the identified mobile SMS devices returned from the agent.

In addition to the above, it should be noted that geographic position self-awareness of mobile devices is becoming more predominant and more precise, and as of Oct. 1, 2001, the Federal Communications Commission has implemented requirements mandating more exact locations of a particular cellular phone to be ascertainable for purposes of allowing emergency and rescue personnel to find a particular caller which has called 911 or another emergency number. Utilizing this technology in an alternative embodiment of the invention, the remote agent compiles a list of mobile devices to be contacted based on the longitude and latitude of the mobile device (instead of its sector location within a given base station's transmission area) as determined by the GPS receiver within the mobile device. This embodiment will allow for further determination of a mobile device's exact location. Under this embodiment of the present invention, a global positioning receiver within the mobile device would transmit the coordinates of a mobile device. Accordingly, either the remote agent or automated calling system is further adapted or further connected to a global positioning agent to identify the mobile devices within the distribution area. In an alternative embodiment of the present invention, a global positioning system is used or included in association with the remote agent or the automated calling system to identify which mobile devices identified within the extended distribution area are actually within the smaller actual distribution area. By utilizing the precision of the global positioning system as described above, the subset of identified devices are further refined to reduce the slight overstatement of the actual distribution area described above.

Another exemplary embodiment of the invention using GPS technology takes advantage of the fact that mobile devices themselves are "smart devices" that are often Java enabled, with significant computing power. In this embodiment, the mapping device of the automated calling system or other equivalent mapping device is used to define a desired message distribution area, such as an emergency area. The VLR and HLR are consulted to determine all mobile devices that are in sectors that make up part of the desired message distribution area. Thereafter, the mobile devices in these sectors are individually called or contacted with a communication that provides coordinates defining the desired message distribution area (e.g., coordinates that define the polygon of the emergency area), and requesting a response concerning whether each mobile device is actually within the desired message distribution area. These individual calls or contacts are made using the unique identification (e.g. telephone number) associated with each mobile device. Of course, additional information other than the desired message distribution area may also be transmitted in the communication to the mobile devices, such as the direction of storm travel, urgency of the message, road conditions, other weather conditions, traffic information, description of warning, etc. After receiving this information, each mobile device receiving the communication uses GPS technology to pinpoint its exact location and then determines if it is within the desired message distribution area. The mobile device(s) then provides a response to the cell tower indicating whether or not the mobile device is within the message distribution area. Using the information in each response, the system then individually calls or contacts each mobile device that has indicated its current location is within the desired message distribution area and delivers the message to that device (whether the message is text, voice, tone, data packet, or other). Each mobile device then presents the message to its user.

In still another embodiment of the invention using GPS technology, an even broader attempt is made to contact mobile devices within a desired message distribution area. According to this embodiment, a message, such as an emergency message or other situation-specific message, is created and associated with the emergency area. All cell towers having a transmission area that comprises a portion of the defined emergency area are instructed to transmit a general communication receivable by all mobile devices within the transmission area of the tower. This communication contains the coordinates of the polygon defining the emergency area and the associated emergency message to the mobile devices within the transmission area of the cell towers. Of course, additional information may also be transmitted in the communication to the mobile devices, such as the direction of storm travel, urgency of the message, road conditions, other weather conditions, traffic information, description of warning, etc. The mobile devices receiving the transmitted communication use GPS technology to determine if they are within the polygonal area that is the emergency area. If a particular mobile device is within the emergency area, that mobile device informs its user that a message has been received, and presents the associated situation-specific message to its user. Presentation of the message is in accordance with the format of the message (e.g., the message may be presented as voice, text, tone, data packet or any other format). On the other hand, if the mobile device is not within the emergency area, the message is not presented to its user.

Yet another example of an exemplary embodiment of the invention using GPS technology adds further features to the systems described in the preceding paragraphs where individual mobile devices via embedded software determine if they are within the emergency area before presenting the emergency message to their user. In this embodiment, each mobile device maintains a log or other equivalent of recent positions for trending purposes. With this trending information, mobile devices can anticipate general areas where it is likely the device will travel in the near future. Accordingly, if an emergency message or other situation-specific message is sent that is associated with an emergency area that the mobile device is not currently in, but is likely to travel to in the very near future based on recent trending information, the mobile device could present the emergency message to that user with a warning stating that the user is headed for the emergency area.

Conversely, if the trending information indicates that the mobile device will soon travel out of the emergency area, the mobile device could either not present the emergency message, or present the emergency message and state that the user will soon pass out of the emergency area. Even though this particular embodiment of the invention and others involving intelligent mobile devices anticipates that the communication with the mobile device could be SMS text, voice or other equivalent format, the use of data packet technology or equivalent communication technology is especially appropriate. The data packet could provide a wide variety of information including but not limited to warning area description, description of warnings, recommended actions, warning level, road conditions, weather conditions, or traffic information. In addition to SMS, data packets can be transmitted via multiple mechanisms including TCP/IP, IBM MQ, HTTP, SOAP, JMS or other equivalent protocols.

In yet another alternative embodiment of the invention, each mobile device includes an applet program capable of providing a reply to an emergency message. For example, the reply could be an automatic reply from the mobile device that simply indicates that the mobile device is in the emergency area or is not in the emergency area. Furthermore, the reply could be generated from the user to indicate that the user is in need of assistance or other appropriate reply.

In each embodiment of the invention, updating of the emergency area along with periodic re-transmission of the emergency message is anticipated. For example, if the emergency message deals with a fast moving tornado or other weather system, the defined emergency area may need to be updated every five or ten minutes. Also, because mobile devices are constantly moving, with mobile devices moving into and out of the emergency area, any emergency message distributed to the emergency area is typically retransmitted at regular intervals (e.g., once a minute). In these situations, the mobile devices may contain applets capable of disregarding an emergency message if it was recently presented to the user of the mobile device (e.g., within the past ten minutes).

One system for distributing messages to multiple mobile devices in an existing cellular network comprises an automated calling system having a mapping device or equivalent system having mapping capability which is used to define a desired message distribution area, and at least one identifying device which is used to obtain identification data about mobile devices operating within the defined message distribution area. The above system could further comprise an automated calling system or equivalent to contact each of the identified devices located within the defined area. Further, a remote agent could be used to identify the mobile devices within the defined area. Additionally, a system comprising a remote agent could further comprise a visitor location register for identifying the mobile devices which are within the defined area but not in their home area, and a home location register for identifying mobile devices within the defined area. Finally, the system could utilize global positioning technology to either identify mobile devices within the desired message distribution area or allow mobile devices themselves to determine if they are within the desired message distribution area.

Another system of distributing messages to multiple mobile devices in an existing cellular network comprises an automated calling system or other system having mapping capabilities which is used to define a message distribution area, a short message service center operable to send short message service communications, and a remote agent which is used to identify mobile devices within the cellular sectors encompassing the message distribution area. The system could further comprise an automated calling system operable to send short message service communications (text, data packet or other equivalent) to mobile devices through the short message service center. Additionally, the system could further utilize global positioning technology to either identify those devices which are actually within the defined message distribution area or allow devices themselves to determine if they are within the defined message distribution area. The devices, through embedded software, could determine whether an emergency message or other situation-specific message should be displayed to its user.

Further, the above embodiments can contain the option of allowing the owners of mobile devices ("mobile subscribers") to opt in or out of the notification service. The mobile subscribers could be contacted by the automated calling system operator to allow the mobile subscribers to determine under what circumstances the mobile subscriber would like to be notified. For example, if the mobile subscriber would prefer to be notified only in the case of weather emergencies but not road emergencies or road closings, the database 57 could be updated to contact the mobile subscriber only when weather emergencies are reported in her area.

Yet another embodiment of distributing messages to multiple mobile devices involves the use of satellite broadcast messages being sent to recipients having a satellite message device. In one embodiment, each transmission is a composite comprising a substantive message and geographic identifying data that identifies the geographic area to which the substantive message pertains ("message distribution area coding"). A satellite message device includes a satellite receiver, and a global positioning device (such as a GPS chip). Alternatively the satellite message device may include a chip for decoding. The term "chip" refers to any micro processing device as is commonly known in the art. In this embodiment, composite satellite transmissions include a substantive message broadcast and message distribution area coding (which could be included in satellite transmission header information) either on a separate channel or as a coding on a substantive message. The substantive message may be data prompting a satellite message device to produce an output to the user, such as a visual, audio, tactile, olfactory, or other output. The composite satellite transmissions are made from a ground transmitter to at least one satellite in orbit for rebroadcast back to Earth. As detailed in FIG. 5, recipients having a satellite message device receive message broadcasts from satellites or a ground repeater depending upon their geographic location or their projected geographic location. When the message broadcasts are received by the satellite message device, the at least one processor compares the message distribution area coding to the current coordinates displayed by the global positioning device. If the current coordinates of the global positioning device fall within the area defined by the message distribution area coding accompanying a particular substantive message broadcast, the message contents of the broadcast are displayed or made audible to the recipient. Therefore, the recipient only hears or sees broadcasts targeted to the recipient's geographic area, although the receiver may be receiving several other broadcast messages.

It will be appreciated by one of ordinary skill in the art that a given satellite transmission has a limited life duration. Therefore, it would be beneficial to transmit a satellite message periodically or continuously. The retransmission or continuous broadcasting is performed so that ground receivers entering a geographic location after a first transmission can be warned by a subsequent transmission once the user enters the geographic location for which the transmission is intended. However, this constant or periodic transmission could cause a receiver to continuously or repeatedly produce a warning to a user each time the transmission is received by the satellite message device, thereby irritating the user. Therefore, according to another embodiment of the present invention, time information indicating either the time of the first transmission, the duration of time for which a substantive message should remain active, an expiration time for the substantive message, a method for canceling display of a particular message, or a combination thereof may comprise a portion of a composite transmission, with the time information being transmitted either on a separate channel or as a coding on a substantive message. Therefore, if the time information contained in a composite message indicates that the substantive message is expired, or should not be communicated to the user, the satellite message device could be programmed so that the substantive message would not be presented to the user.

In another exemplary embodiment of the present invention, a composite transmission could contain a unique identifying code for the particular substantive message such that, for example, the satellite message device could be programmed to present the substantive message associated with that unique identifying code only once (or, optionally, any number of times desired by the user). Thereafter, if the substantive message having the identical unique identifying code is retransmitted or continuously transmitted, it would not be presented to the user more than one time (or optionally, not more than the number of times selected by the user). Further, if the substantive message discussed above is altered to include additional information regarding the same event or topic, the unique identifying code associated with the transmission of the updated substantive message could be changed, thereby helping to ensure that subsequent substantive messages relating to the same event or topic is presented to the user.

Further, another exemplary embodiment of the invention adds a further feature to the system and method described in the preceding paragraph. In this embodiment, each satellite message device may include software to determine if the recipient is traveling into the message distribution area (or emergency area). The software may be embedded in the device itself, received as a portion of a satellite transmission, By maintaining a log or other equivalent of recent positions, the software can anticipate general areas where the satellite message device is likely to travel in the near future by trending the logged data. For example, a log of the satellite message device's location in each of the past three five minute intervals could be used to determine the average direction traveled, the average speed in which the satellite message device is traveling. By using that data and the current position of the satellite message device, a processing chip could be equipped with software capable to project whether the satellite message device is likely to travel outside of the message distribution area. For example, if the software projects that the satellite message device will travel outside the message distribution area within a pre-set time, such as (for example only) five minutes, the substantive message will not be displayed to the user.

Further, the message distribution area coding could contain information dictating when the processing chip equipped with projection software should present the message to the user and when it would be acceptable not to present a message to a user. For example, the message distribution coding associated with an earthquake warning or other large scale disaster may include instructions to a processor to present the message to a user even if it is projected that the satellite message device will soon be outside of the message distribution area. Additionally, a mapping program may be used to further used in association with the processing chip to further refine the projection of when a satellite message device will enter or leave a message distribution area. Conversely, the same projection software can be used to display a message to a user who is projected to be within a message distribution area within a specified period of time.

Figure 5:
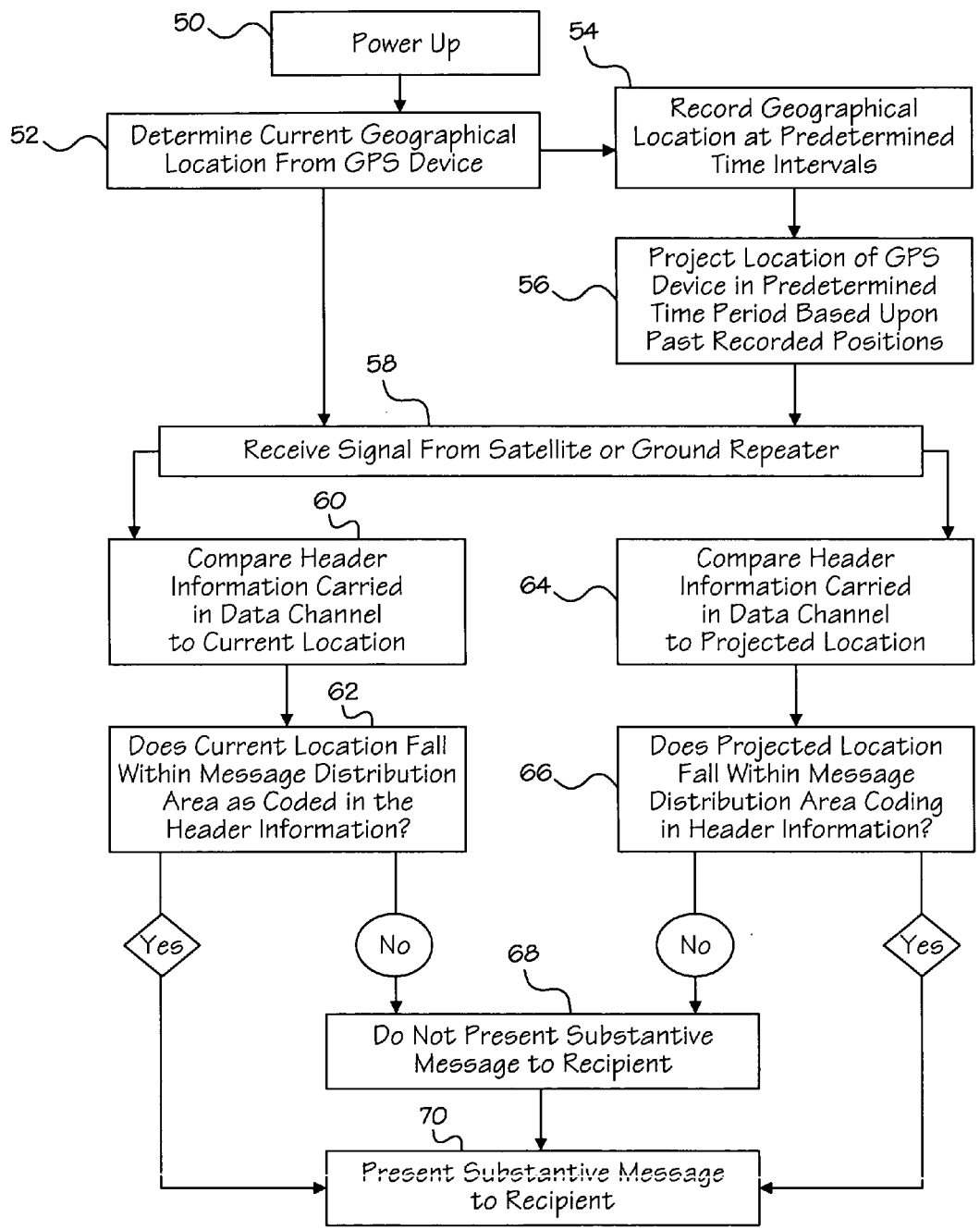
FIG. 5 shows a flow chart depicting a method of receiving satellite messages based upon geographic location of the receiver.

In application, one method of utilizing geographic information to determine whether a message is to be displayed to a recipient according to one embodiment of the present invention is shown in FIG. 5. Once a satellite message device is powered up, the device determines its geographic location 52. During operation, the device continues to monitor its geographic location at set time intervals, recording at least the last two locations for future reference 54. If there are at least two recorded geographical locations recorded, a projected location of the device in a given amount of time can be calculated. For example, if a device was recorded as being at point A ten minutes ago, point B (one mile south of point A) five minutes ago, and point C currently (two miles south of point A), the projected location of the device five minutes from now is three miles south of point A, according to one projection algorithm. Certainly, a number of different projection calculations may be used by the processor to project a device's location within a certain amount of time. However, once a signal is received from a satellite or ground repeater 58, the current geographic location and projected location of the device (if calculable) are compared to geographic distribution data carried in the data channel (60 and 64). If the current location falls within the message distribution area coded in the header information (62), then the substantive message is presented to the recipient or user of the device (70). Further, if the device is not currently within the message distribution area coded in the header information, but the projected location falls within the distribution area coded in the header information (66), the substantive message is further presented to the recipient of the user device (70). However, if neither the current location nor the projected location falls within the message distribution area, the substantive message is not presented to the recipient. However, the cycle then restarts, as the device continuously monitors its current geographic location (52) and compares it to any incoming signals from a satellite or ground repeater (58).

It will be appreciated that the above example indicates a simplistic model of how a satellite message device may project whether it will soon be within the distribution area. For example, one of ordinary skill in the art will appreciate that a satellite message device may be geographically aware to the extent that the device, through mapping software, can identify, for example, the highway upon which the user is traveling, and may project a likely destination or destinations where the user will be located within a given period of time. Further, the satellite message device may use this projected destination calculation in conjunction with information from warnings within a projected area to calculate and recommend an alternate route based upon that information. For example, if a satellite message device uses a geographic location device (such as a GPS chip) along with mapping software to determine that the user is traveling west on interstate 70, the satellite message device may monitor all transmissions related to locations west of its current location on interstate 70 to identify any hazards, delays, or pertinent information. One such transmission, as an example, may indicate that interstate 70 has been temporarily closed twenty miles ahead, prompting satellite message device to alert the user of the hazard, delay, or pertinent information and further proposing a new route to the user (if available) that would likely reduce travel time or take user out of the danger zone identified. Should a later transmission indicate that the delay or hazard has subsided since the previous warning and before the user has altered his course, the satellite message device could thereafter alert the user that the alternate route is no longer a preferred route.

Additionally, it will be appreciated that the above embodiment may be used with mapping software in which a user indicates his route or destination, and the satellite message device continuously updates the user of alternate preferred routes based upon hazards, delays, or other pertinent information that is received via satellite transmission.

In yet another alternative embodiment of the invention, each mobile device includes an applet program capable of providing a reply to an emergency message. For example, the reply could be an automatic cellular, WiFi, or two way satellite reply from the mobile device that simply indicates that the mobile device is in the emergency area or is not in the emergency area. Furthermore, the reply could be generated from the user to indicate that the user is in need of assistance or other appropriate reply.

In another variant of the current embodiment, the satellite message device does not include a global positioning device, but the at least one processor is programmed with the approximate device location, or with the location that the recipient is interested in monitoring. Programming the satellite message device with the geographic location of the device may be accomplished by inputting the latitude and longitude coordinates of the device or the Zip Code or Zip+4 code, the telephone area code, the street address, or the census tract number where the device is located or where the user wishes the device to monitor. Thereafter, when a message broadcast including geographic identifying data is received by the satellite message device, the at least one processor compares the geographic location data with the programmed device location or interested location. If the device location or interested location is included within the message distribution area code of the message broadcast, the message is displayed or made audible to the recipient. If the device location or interested location is not included within the message distribution of the message broadcast, the message is not displayed or made audible by the satellite message device. In this manner, a recipient receives only information pertinent to the programmed location of the device or the programmed interested location of the device.

It should be noted that each of the satellite message devices as described above do not contain satellite transmitters, but may be outfitted with mobile satellite transmitters to send a response back to a sender or to contact a third party. Therefore, the recipient may not only receive, but transmit messages from the satellite message devices. Further, the satellite message devices my alternatively be equipped with a cellular phone or other cellular communication, WiFi, or other wireless protocol device wherein the recipient may receive auxiliary messages or identical geographic messages from a cellular transmitting tower if satellite reception is poor. Further, the cellular device may allow the recipient to contact the individual or device transmitting a message, an agency responsible for originating a message, or an appropriate third party.

Figure 6:
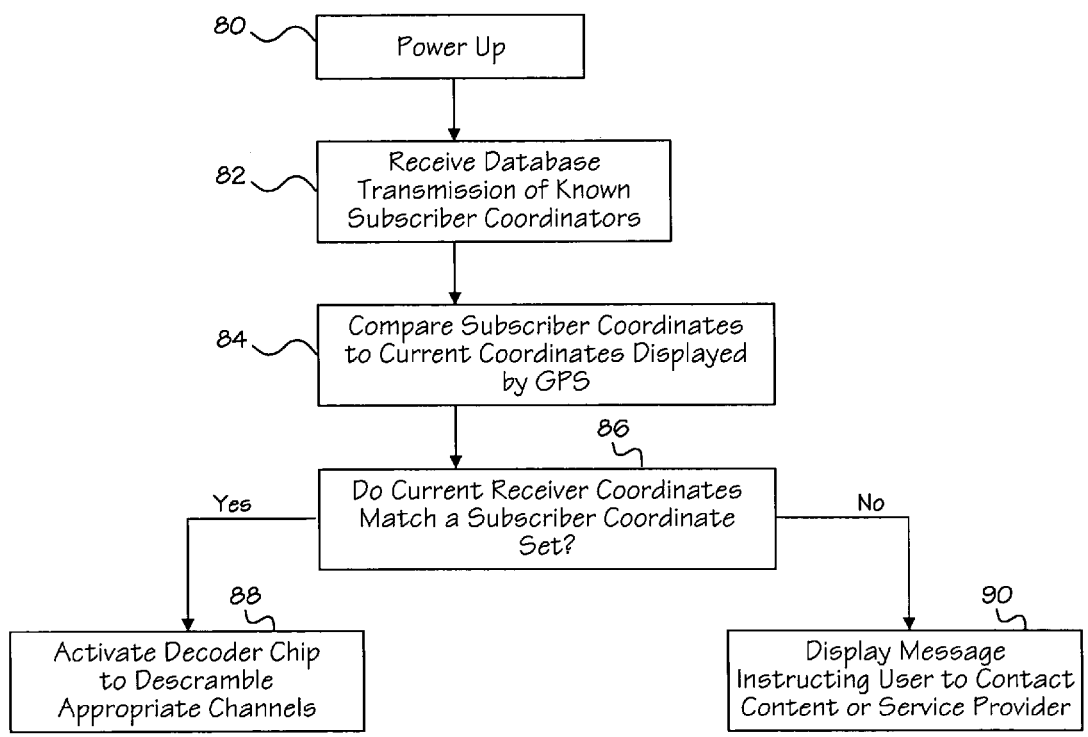
FIG. 6 shows a flow chart depicting a method of descrambling a satellite transmission based upon the geographic location of the receiver.

In yet another variant of the satellite embodiment, a stationary ground receiver and descrambling box such as those used to receive television or radio programming from content providers such as the Dish Network or DirecTV, is equipped with a global positioning device. In this embodiment, the descrambling box is in communication with a processor within the descrambling box. In operation, a customer purchases or receives a stationary ground receiver and a descrambler box and global positioning device from a retailer or content provider, and subscribes to a content provider to receive programming broadcasts. The content provider maintains a database of content subscribers, including the address and global positioning coordinates for each subscriber. As shown in FIG. 6, upon powering up the descrambling box (80), the descrambling box receives a transmission from the content provider containing the approximate coordinates of all content subscribers (82) and compares the transmitted subscriber coordinates with the coordinates currently displayed by the global positioning system (84). If the coordinates currently displayed by the global positioning system correspond to one of the subscriber coordinates, the descrambler box is activated to descramble the transmission data from the content provider, and the recipient is able to view the content from the content provider on his television (86, 88). If the coordinates displayed by the global positioning system do not correspond to one of the subscriber coordinates, the descrambler box will: not descramble the transmissions from the content provider; display a message on the television screen prompting the user to call the content provider to update its records; and/or power down (90). Alternately, if the coordinates displayed by the global positioning system do not correspond to one of the subscriber coordinates, the descrambling box can be programmed to contact the content provider via an attached or imbedded telephone, cellular phone, radio transmission, or Internet connection and provide the content provider with the current coordinates of the descrambler box and ground receiver being used without a subscription to a service from the content provider.

Although the present invention has been described in considerable detail with reference to certain preferred versions thereof, other versions are possible, such as integrating the remote agent and the automated calling system so that the automated calling system is operable to interact with the switching office, or utilizing an alternate positioning system to identify those mobile devices within the distribution area. Further, it will be appreciated that a television equipped with a satellite receiver may be used as a satellite message device operable to receive warnings for a particular geographic location. Therefore, the spirit and scope of the appended claims should not be limited to the description of the preferred versions contained herein.

What is claimed is:

1. A method of distributing a message to at least one message device, the method comprising the steps of: receiving, in the message device, a message having a defined geographic area of transmission and having information indicative of the boundaries of a defined geographic delivery area in which the message is to be delivered to a recipient; determining the geographic location of the message device; projecting, in the message device, at least one future location of the message device based at least in part on at least one past location of the message device, without knowledge of the recipient's final destination; and automatically communicating the message to a recipient when the projection indicates that the message device will be within the boundaries of the defined geographic delivery area.

2. The method of claim 1 wherein the geographic location of the message device is determined by a global positioning system chip, and wherein the method further comprises the step of providing mapping software.

3. The method of claim 1 further comprising the step of preventing communication of a subsequent message having an identical identifying code.

4. The method of claim 1 wherein communicating the message comprises communicating the message to the recipient if the location of the message device is projected to be in the geographic area during a portion of a defined time.

5. The method of claim 4 wherein the message includes an indication of the defined time.

6. A method of distributing messages to at least one satellite receiving device, the method comprising the steps of: receiving from a satellite at a message device a message comprising a substantive message and a message distribution area coding defining a geographic area of message delivery; self-determining at the message device the geographic location of the message device; projecting, in the message device at least one future location of the message device based at least in part on at least one past location of the message device, without knowledge of the final destination of the message device; communicating the substantive message from the satellite message device to a recipient if the substantive message is associated with a message distribution area coding that defines the boundaries of a geographic area of message delivery which corresponds to a projected at least one future location of the message device; and identifying at least one alternate route with the satellite message device in response to contents of the substantive message.

7. The method of claim 6, further comprising the step of displaying the alternate route to a user.

8. A device for receiving satellite messages, the device comprising: a satellite receiver; a global positioning system; at least one processing chip in communication with the global positioning system, wherein the at least one processing chip is configured to present a message to a person operating the receiver if the global positioning system indicates that the device is within the boundaries of a defined geographic message distribution area that is coded in a satellite transmission; at least one of the at least one processing chip is configured to compare the message distribution area coding with current coordinates displayed by the global positioning system; and software configured to record the past locations of the device and project the future location of the device based at least in part upon at least one past location and without knowledge of the device's final destination, such that a message may be presented to the person operating the device if it is projected that the device will be within the boundaries of the defined message distribution area during a portion of a defined time.

9. A device for receiving satellite messages, the device comprising: a satellite receiver configured to receive transmissions from at least one satellite; a global positioning system configured to identify the geographic location of the device; at least one processing chip in communication with the satellite receiver and global positioning system, configured to compare a message distribution area code defining a geographic area of message delivery which is transmitted in a satellite transmission, with the current geographic location of the device and to automatically initiate communication of the message to a recipient if the device is projected to be within the message distribution area; wherein projecting if the device is to be within the message distribution area comprises projecting, in the device, at least one future location of the device based at least in part on at least one past location of the device, without knowledge of the recipient's final destination; a display or audible transmitter for communicating a message to a recipient; and software configured to project a future geographic position of the device based at least in part on at least one past geographic position of the device.

10. The device of claim 9 wherein the software is further configured to display a message to a person operating the device if the device is projected to be within the message distribution area during a portion of a defined time.

11. The device of claim 9 wherein the software is further configured to prevent displaying a message to a person operating the device if the device is projected to leave the message distribution area within a defined time period.

12. The device of claim 9 wherein the satellite receiver is further configured to receive transmissions from at least one ground repeater.

13. A device for preventing piracy of satellite transmissions comprising: a database of fixed geographic locations of specified satellite service subscribers; a global positioning system; software configured to record the past locations of the device and project the future location of the device based at least in part upon at least one past location and without knowledge of the device's final destination; and a satellite receiver associated with a specified satellite service subscriber, the receiver having at least one processing chip, the receiver configured to compare current global positioning system coordinates with the geographic location information of subscribers included in a satellite transmission to the receiver, and further configured to descramble a substantive transmission included in a satellite transmission to the receiver in the event that the current global positioning system coordinates correspond with at least one of the fixed geographic locations of the associated satellite service subscriber.

14. The device of claim 13 further comprising a telephone connection configured to contact a satellite service provider if the global positioning system coordinates do not fall within at least one geographic location of satellite service subscribers.

15. The device of claim 13 wherein the geographic information of subscribers is included in the satellite transmission to the server.

* * * * *